United States Patent
Tanaka

(10) Patent No.: US 7,577,354 B2
(45) Date of Patent: Aug. 18, 2009

(54) DIGITAL CAMERA WITH FACE DETECTION FUNCTION FOR RED EYE REDUCTION

(75) Inventor: Toshiyuki Tanaka, Yokohama (JP)

(73) Assignee: Samsung Techwin Co., Ltd., Changwon (KR)

(*) Notice: Subject to any disclaimer, the term of this patent is extended or adjusted under 35 U.S.C. 154(b) by 367 days.

(21) Appl. No.: 11/522,615

(22) Filed: Sep. 18, 2006

(65) Prior Publication Data
US 2007/0147822 A1 Jun. 28, 2007

(30) Foreign Application Priority Data
Dec. 27, 2005 (JP) .............................. 2005-373701

(51) Int. Cl.
G03B 15/03 (2006.01)
(52) U.S. Cl. ...................................... 396/158
(58) Field of Classification Search ................. 396/158, 396/14, 15, 16, 17, 18; 348/221.1, 370
See application file for complete search history.

(56) References Cited

U.S. PATENT DOCUMENTS

| | | | | |
|---|---|---|---|---|
| 4,285,588 A | * | 8/1981 | Mir | 396/158 |
| 4,999,663 A | * | 3/1991 | Nakamura | 396/89 |
| 5,737,647 A | * | 4/1998 | Nakajima et al. | 396/106 |
| 5,822,624 A | * | 10/1998 | Fukuhara et al. | 396/61 |
| 7,298,412 B2 | * | 11/2007 | Sannoh et al. | 348/348 |
| 7,414,667 B2 | * | 8/2008 | Ichimasa | 348/371 |
| 7,430,369 B2 | * | 9/2008 | Fukui | 396/78 |
| 2005/0219385 A1 | * | 10/2005 | Terakawa | 348/239 |

FOREIGN PATENT DOCUMENTS

| | | |
|---|---|---|
| JP | 2005-094571 A | 4/2005 |
| JP | 2005-167697 A | 6/2005 |
| JP | 2005-191687 A | 7/2005 |

* cited by examiner

Primary Examiner—W B Perkey
Assistant Examiner—Noam Reisner
(74) Attorney, Agent, or Firm—Drinker Biddle & Reath LLP

(57) ABSTRACT

A digital camera that compensates a red eye phenomenon during photography is provided. The digital camera includes a charge coupled device (CCD), a face detection circuit, a flash mode controller, and a flash. When the flash preliminarily emits light, the face detection circuit detects an eye color of a person from an image captured by the CCD. The flash mode controller preliminarily flashes the flash before a main photographing is performed, and may subsequently actuate the flash for a main flashing based on a photographing result of the CCD, when the eye color detected by the face detection circuit is within a predetermined scope, holds the main flashing ready while a predetermined red eye reduction standby time passes after the flash preliminarily emits light.

21 Claims, 3 Drawing Sheets

DIGITAL CAMERA WITH FACE DETECTION FUNCTION FOR RED EYE REDUCTION

CROSS-REFERENCE TO RELATED PATENT APPLICATIONS

This application claims the priority of Japanese Patent Application No. 2005-373701, filed on Dec. 27, 2005, in the Japanese Patent Office, the disclosure of which is incorporated herein in its entirety by reference.

BACKGROUND OF THE INVENTION

1. Field of the Invention

The present invention relates generally to a digital camera, and more particularly to a digital camera including a flash and a face detection function for reducing a red eye phenomenon.

2. Description of the Related Art

When human beings are in a dark place for a predetermined time, their pupils are in a state of dilation. At this time, flash photographing causes a red-eye phenomenon since a flash reflects off retinas. To avoid the red-eye phenomenon, a conventional camera's lens and flashing unit are separated from each other so that light reflected off the retinas is not photographed. However, since the lens and the flashing unit of compact cameras are not separated from each other due to the size of the compact cameras, many cameras emit light in advance in order to contract the pupils of subjects. In other instances, cameras may compensate for the red eye phenomenon by estimating a color of the eyes from a color around the pupils, or by using a color of eyes extracted from another image.

However, to reduce the red-eye phenomenon by emitting light of cameras in advance, a user must set an operation of flashing/no flashing/automatic flashing and designate an operation of red-eye reduction/no red-eye reduction, which may be a complex operation. Also, when human beings are photographed at a small size, the photographed image may be erroneously corrected at a different color.

SUMMARY OF THE INVENTION

According to an aspect of the present invention, there is provided a camera comprising: a photographing means capturing an image of a subject; a flashing constituent that emits light toward the subject; a flashing control constituent that controls a preliminary flashing operation of the flashing constituent before a main photographing is performed, and a main flashing operation of the flashing constituent based on a preliminary photographing result of the photographing means during the preliminary flashing operation; and a detection constituent that detects an eye color of a subject with a face from the preliminary image captured by the photographing means when the flashing constituent performs the preliminary flashing operation.

In operation, when the eye color detected by the detection constituent is within a predetermined scope, the flashing control constituent holds the main flashing ready while a predetermined red eye reduction standby time passes after the flashing constituent performs the preliminary flashing operation. The flashing control constituent may change the red eye reduction standby time according to a photographing environment. The flashing control constituent holds the main flashing ready when the eye color detected by the detection constituent is within a predetermined scope of the color and brightness.

The camera may further comprise: an evaluation constituent which evaluates the brightness of the image captured by the photographing means, wherein the scope of the color and brightness is increased when a brightness evaluation value of the evaluation constituent is smaller than a previously defined threshold value, while the scope of the color and brightness is reduced when the brightness evaluation value is greater than the previously defined threshold value.

The flashing control constituent may flash the flashing constituent during the red eye reduction standby time to effect pupil constriction when the eye color detected by the detection constituent is dark red.

The camera may further comprise: an informing constituent informing the person that the camera is in the red eye reduction standby time. The informing constituent may inform the person that the camera is in the red eye reduction standby time by flashing the flash constituent intermittently. The informing constituent may inform the person that the camera is in the red eye reduction standby time by emitting sound. The informing constituent may comprise a light emitting means that informs the person that the camera is in the red eye reduction standby time by emitting an indicator light different from the flashing constituent.

DETAILED DESCRIPTION OF THE EMBODIMENTS

The present invention will now be described more fully with reference to the accompanying drawings.

Figure 1:
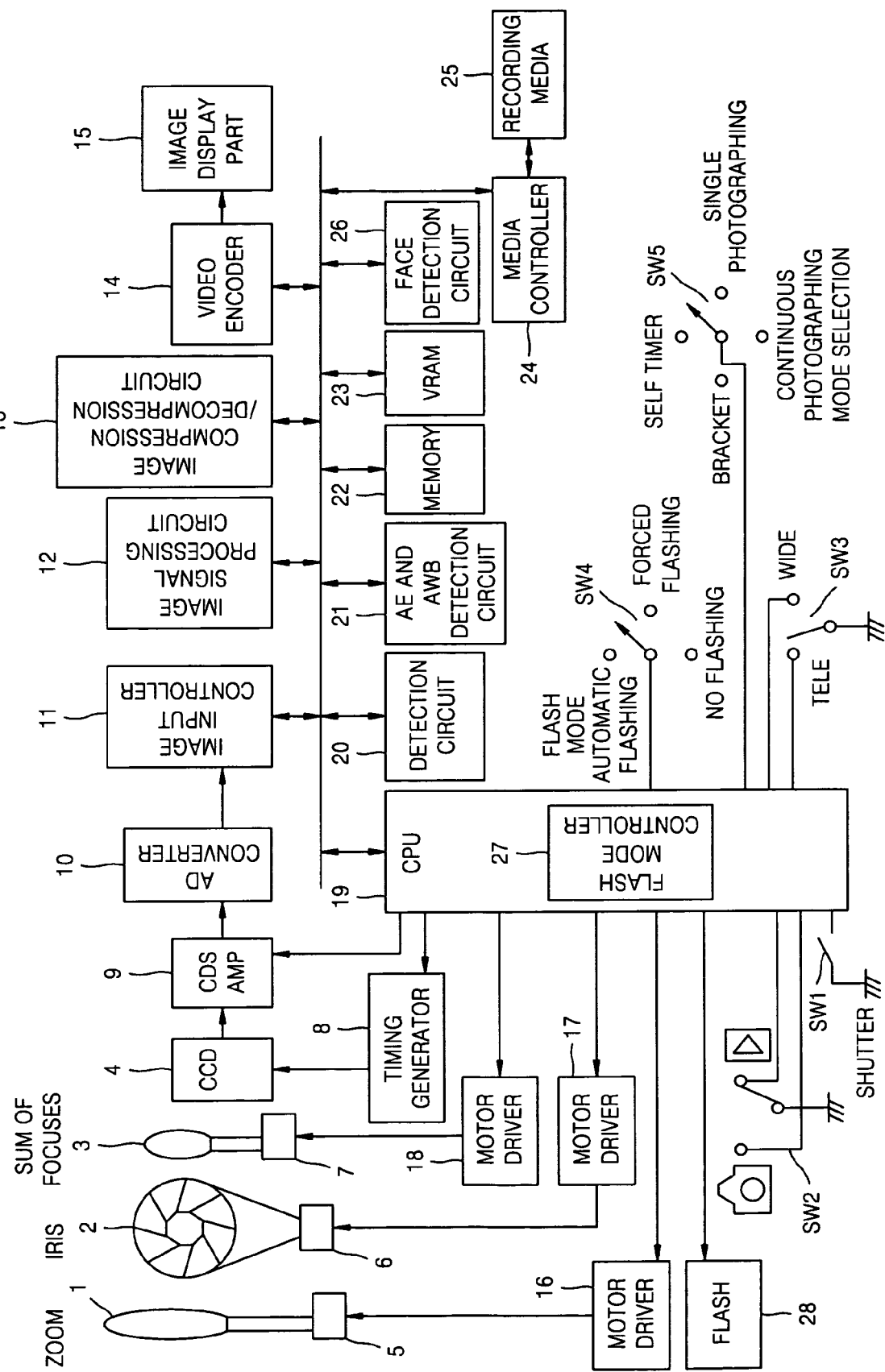
FIG. 1 is an example block diagram of a digital camera according to an embodiment of the present invention.

FIG. 1 is a block diagram of an example digital camera according to an embodiment of the present invention. Referring to FIG. 1, the digital camera comprises a zoom lens 1, an iris 2, a focus lens 3, a charge coupled device (CCD) 4, a zoom motor 5, a iris motor 6, a focus motor 7, a timing generator 8, a correlated double sampling amplifier (CDSAMP) circuit 9, and a flash 28. The lens 1, the iris 2, the focus lens 3, and the CCD 4 are the constituents of a photographing part for photographing a subject.

The iris motor 6 comprises an iris variation unit that varies an opening of the iris 2. The timing generator 8 comprises a shutter speed variation unit that varies a shutter speed.

The CDSAMP circuit 9 forms a gain variation unit that varies amplitude of an output of the CCD 4. The iris motor 6, the timing generator 8, the CDSAMP circuit 9, and the flash 28 are the constituents of an exposure variation part that varies an exposure of the photographing part.

The zoom motor 5 moves the zoom lens 1. The iris motor 6 controls opening degree of the iris 2. The focus lens 3 is controlled by the focus motor 7. A subject light (i.e., a light reflected from a photography subject) is received via the zoom lens 1, the iris 2, and the focus lens 3 so that a focused image of the subject is formed on a light receiving surface of the CCD 4.

The CCD 4 photo-converts the subject light formed on the light receiving surface. The CCD 4 may be a complementary metal oxide semiconductor (CMOS) device. A color filter may be arranged on the front surface of the CCD 4. The color filter may use three primary colors, red R, green G, and blue B, or use three complementary colors, cyan Cy, magenta Mg, and yellow Ye. The CCD 4 is operated by a timing signal produced by the timing generator 8.

The flash 28 emits light according to timing and the radiation intensity signals received from a CPU 19. The radiation intensity is classified as a main flashing operation and a preliminary flashing operation. The preliminary flashing operation may be performed in a shorter time than the main flashing operation. The preliminary flashing operation may be a lower intensity of radiation (i.e., not as bright) than the main flashing operation in order to promptly perform the main flashing operation after the preliminary flashing operation is performed.

The digital camera of the current embodiment comprises an A/D converter 10, an image input controller 11, an image signal processing circuit 12, an image compression/decompression circuit 13, a video encoder 14, an image display part 15, motor drivers 16, 17, and 18, the CPU 19, an automatic focus (AF) detection circuit 20, an automatic exposure (AE) and auto white balance (AWB) detection circuit 21, a memory 22, a video RAM (VRAM) 23, a media controller 24, recording media 25, and a face detection circuit 26. The digital camera of the current embodiment further includes a shutter switch SW1, a recording/reproduction switch SW2, a zoom switch SW3, a flash mode switch SW4, and a photographing mode selection switch SW5.

The A/D converter 10 digitizes an image signal that is output by the CCD 4 and received through the CDSAMP circuit 9. The image input controller 11 provides the CPU 19 with the image signal output by the A/D converter 10.

The image signal processing circuit 12 performs image processing such as gamma correction, edge emphasis, white balance, etc. on the received image signal. The CPU 19 sets the parameters used by the image signal processing circuit 12 to perform the image processing.

The image compression/decompression circuit 13 compresses and encodes image data. The image data, not necessarily restricted thereto, may be compressed as joint photographic experts group (JPEG), that is, the standards for image compression based on a discrete cosine transform (DCT).

The VRAM 23 is a memory for storing data of an image displayed on the image display part 15.

The video encoder 14 reads the image data stored in the VRAM 23, forms a component color video signal based on corresponding image data, and outputs the component color video signal to the image display part 15. The image display part 15 is a display such as a liquid crystal display (LCD) that displays a color image based on the received component color video signal from the video encoder 14.

The AF detection circuit 20 controls auto-focusing of photographed images based on the output of the CCD 4. The AF detection circuit 20 detects a high frequency component level of the image signal for performing the AF. In detail, the high frequency component level of the image signal is increased by the sum of focuses.

Therefore, if the AF detection circuit 20 detects the high frequency component level of the image signal, the state of the sum of focuses can be determined. The detected high frequency component level of the image signal is integrated in a predetermined focus region to calculate an AF evaluation value. The calculated AF evaluation value is provided to the CPU 19.

The face detection circuit 26 detects a person's face from the image signal output by the CCD 4 and extracts the color of the eyes of the detected face. The face detection circuit 26 extracts a region of skin color from the image signal, extracts a contour of the face based on the variance of brightness of the extracted region of skin color, and checks whether the region of the face includes two eyes and a mouth. If it is checked that the region of the face includes two eyes and a mouth, the region is determined as the person's face. Furthermore, the face detection circuit 26 extracts a color of the irises of the two eyes and transmits the extracted color of the irises to the CPU 19 for color determination processing.

The AE and AWB detection circuit 21 forms an exposure control signal and a white balance control signal sequentially as described below based on the image signal output by the CCD 4 to control exposure and process white balance, and transmits the exposure control signal and the white balance control signal to the CPU 19.

The exposure control signal is referred to as a brightness evaluation value that indicates brightness of an image. The brightness evaluation value is an average brightness value of the entire images calculated by the AE and AWB detection circuit 21 with respect to the received image signal. The brightness evaluation value can be calculated by giving weights to the region of the face detected by the face detection circuit 26.

The white balance control signal is referred to as a B gain and an R gain. The B gain is a magnification of a blue component of each pixel of the white balance control, and the R gain is a magnification of a red component of each pixel of the white balance control. The white balance control is the control of balance of three primary colors by not changing (first magnification) a green component of the three primary colors of each pixel but multiplying the B gain and the R gain by the blue and red components, respectively. The AE and AWB detection circuit 21 calculates an average value of the red, blue, and green components of the whole images so that a value obtained by dividing an average value of the green component by an average value of the blue component is the B gain, and a value obtained by dividing the average value of the green component by an average value of the red component is the R gain.

In the current embodiment, the CPU 19, which is a calculation constituent for controlling the digital camera, further includes a flash mode controller 27. The flash mode controller 27 will be described in detail with reference to the operation of the digital camera using the flash 28. The CPU 19 receives input signals via the shutter switch SW1, the recording/reproduction switch SW2, the zoom switch SW3, the flash mode switch SW4, and the photographing mode selection switch SW5. Also, the CPU 19 outputs a zoom driving signal for moving the zoom lens 1, a focus driving signal for moving the focus lens 3, an iris driving signal for controlling the iris 2, and a gain control signal for controlling the gain of the CDSAMP circuit 9.

The memory 22 includes a read only memory (ROM), which may be a non-volatile memory storing a program for execution by CPU 19, and a random access memory (RAM), which may be a volatile memory used as an operation memory when the CPU 19 is operated.

The shutter switch SW1 is a switch for photographing an image when pressed in a recording mode.

The recording/reproduction switch SW2 is a switch that sets the digital camera to recording mode in which an image is photographed, and to reproduction mode in which the photographed image is displayed on the image display part 15.

The zoom switch SW3 is a switch for moving the zoom lens 1 when the digital camera is in the recording mode.

The flash mode switch SW4 is a switch that sets automatic flashing/forced flashing/no flashing which are flashing modes of the flash 28.

The photographing mode selection switch SW5 is a switch for selecting one photographing mode from among a self-timer mode, a continuous photographing mode, a single-photographing mode, and a bracket mode according to photographing status.

The media controller 24 reads/writes data from/to the recording media 25.

The recording media 25 records a compressed and encoded image signal as an image file, and may be, for example, a card-type detachable memory using a flash memory. The recording media 25 may be a non-volatile memory, a magnetic tape, a magnetic disk, an optical disk, etc.

The operation of the digital camera will now be described. A main power of the digital camera is turned on/off via an operation of a power switch (not shown). When the digital camera is turned on, the digital camera initializes the memory 22.

When the recording/reproduction switch SW2 is set to the recording mode, the CCD 4 continuously stores and updates an image in a viewfinder-like, photography-ready state even when the image being viewed is not photographed. The CPU 19 receives the image signal through the CDSAMP circuit 9, the A/D converter 10, and the image input controller 11. The CPU 19 transmits the digital image signal to the image signal processing circuit 12.

The image signal processing circuit 12 performs image processing such as gamma correction, edge emphasis, white balance, etc. for the received image signal, and outputs the processed image signal. The image signal is stored in the VRAM 23 as image data by the CPU 19. The video encoder 14 forms a component color video signal based on the image data stored in the VRAM 23 and transmits the component color video signal to the image display part 15. Since the image display part 15 displays the component color video signal, it displays a monitor image of the subject being photographed.

The CPU 19 inputs the image signal input in the image signal processing circuit 12 to the AE and AWB detection circuit 21, and obtains the exposure control signal and the white balance control signal. The CPU 19 outputs an iris driving signal and a gain setting signal based on the exposure control signal. The iris driving signal is provided to the iris motor 6 by the motor driver 17 and an opening of the iris is controlled at a predetermined signal level. The gain setting signal is provided to the CDSAMP circuit 9 and the gain of the CDSAMP circuit 9 is controlled at a predetermined signal level. The CPU 19 sets the B gain and the R gain of the image signal processing circuit 12 based on the white balance control signal. As described above, the exposure and the white balance always remain in an optimal state in order to photograph an image at anytime.

At this stage, when the zoom switch SW3 is operated, the CPU 19 outputs the zoom driving signal. The zoom driving signal is provided by the motor driver 16 to the zoom motor 5 that moves the zoom lens 1.

Figure 2:
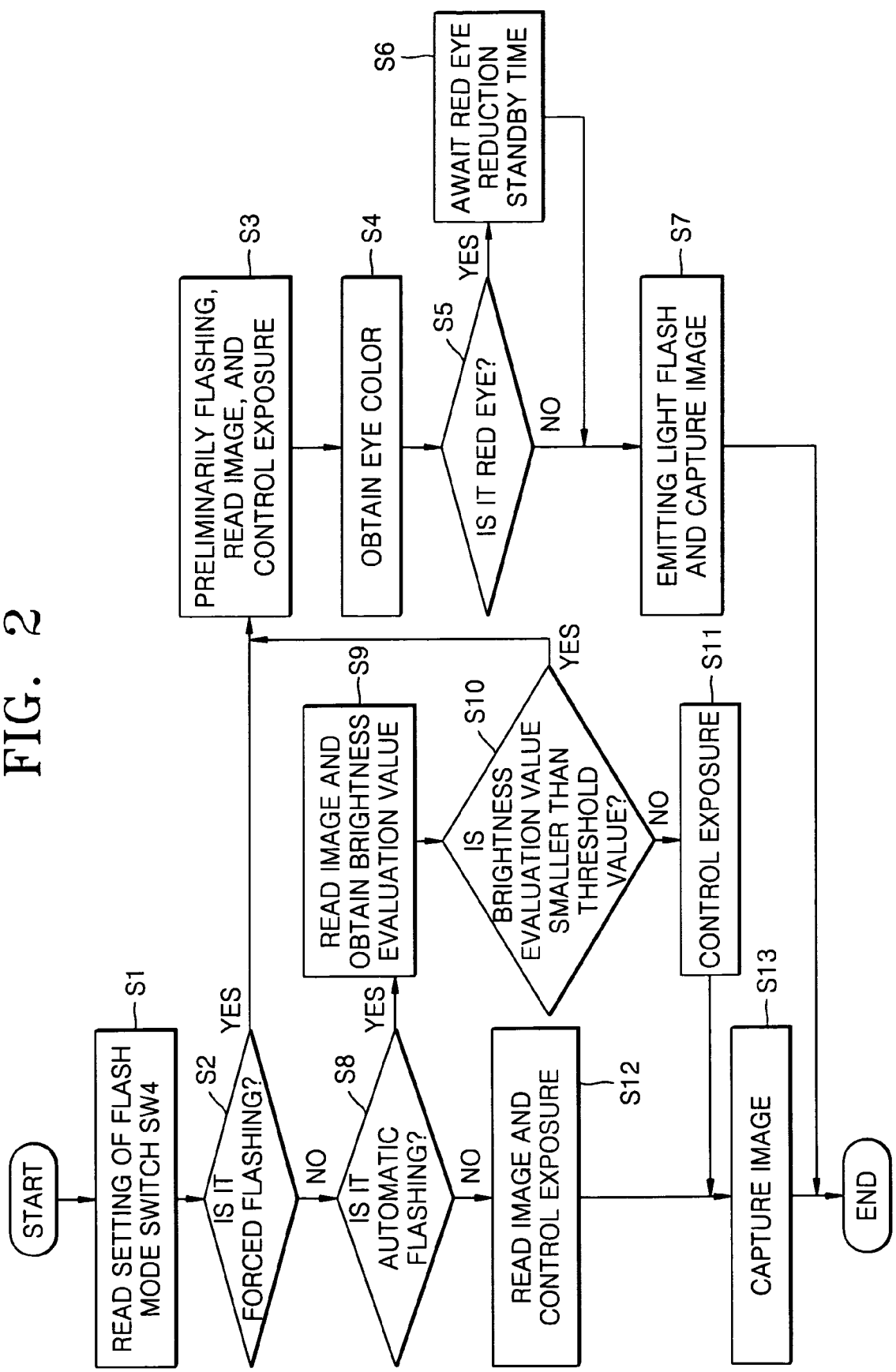
FIG. 2 is a flowchart of an example operation of a flash mode controller according to an embodiment of the present invention.

The operation of the digital camera when photographing a subject will now be described. FIG. 2 is a flowchart of an operation of the flash mode controller 27 according to an embodiment of the present invention. Referring to FIG. 2, the photographing mode selection switch SW1 is set in a single-photographing mode. If the shutter switch SW1 is pressed, the flash mode controller 27 of the CPU 19 senses that the shutter switch SW1 is pressed, and reads the setting of the flash mode switch SW4 (Operation S1). If the flash mode switch SW4 is set to forced flashing (Operation S2), the condition of Operation S2 is satisfied and Operation S3 is performed. In Operation S3, the flash mode controller 27 sends a preliminary flashing to the flash 28 and a shutter signal to the timing generator 8 so that an image photographed when the preliminary flashing operation is performed is stored in the CCD 4. The image is displayed on the image display part 15 in the same manner when the recording/reproduction switch SW2 is set to the recording mode, and is used to control exposure and white balance in Operation S3.

The flash mode controller 27 receives the image stored in the CCD 4 as an image signal, and outputs the image signal to the face detection circuit 26. The face detection circuit 26 detects a color of a person's eyes from the image signal, and transmits the color to the CPU 19 (Operation S4). The flash mode controller 27 receives the color of the person's eyes transmitted to the CPU 19, and determines whether the color is within the scope of previously defined red-eye color and brightness (Operation S5). If it is determined that the color is within the red-eye scope, the flash mode controller 27 in Operation S6 awaits a previously defined red-eye reduction standby time T2 (FIG. 3), and sends an instruction to perform a main flashing operation to the flash 28, and sends the shutter signal to the timing generator 8 for photographing an image (Operation S7). If it is determined in Operation S5 that the color is beyond the red-eye scope, the flash mode controller 27 sends the instruction to perform the main flashing operation to the flash 28 (i.e., Operation S6 is bypassed), and sends the shutter signal to the timing generator 8 to photograph the image in Operation S7.

Accordingly, the image photographed when the main flashing operation is performed is stored in the CCD 4 regardless of whether the color is within the scope or not. The CCD 4 outputs the image as an analog image signal. The analog image signal is gain-controlled by the CDSAMP circuit 9 and is converted into a digital image signal by the A/D converter 10. The digital image signal is input to the CPU 19 through the image input controller 11. Thereafter, the image signal processing circuit 12 performs image processing such as gamma correction, edge emphasis, white balance, YC conversion, etc. with respect to the input digital image signal. The image compression/decompression circuit 13 compresses data of the input digital image signal, and records the compressed data of the input digital image signal as an image file in the recording media 25 via media controller 24.

Figure 3:
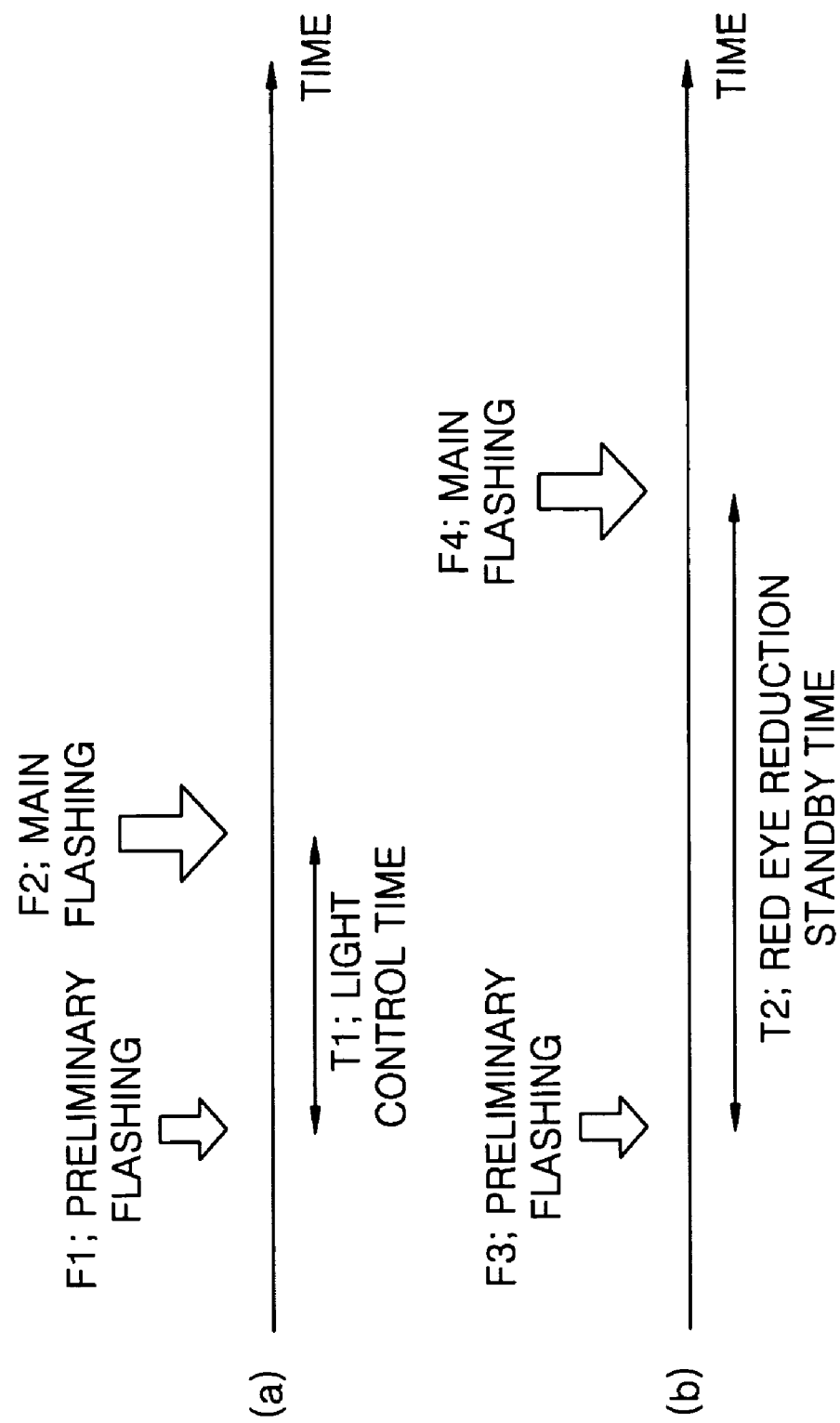
FIGS. 3A and 3B illustrate a time relationship between a main flashing operation and a preliminary flashing operation of the digital camera according to an embodiment of the present invention.

When the red eye is not detected, a light control time T1 between a preliminary flashing operation F1 and a main flashing operation F2 is made as short as possible as illustrated in FIG. 3, timeline (a). When the red eye is detected, a red eye reduction standby time T2 between a preliminary flashing operation F3 and a main flashing operation F4 is required to allow for a time for contracting of the pupils of a person who is a subject.

If the flash mode switch SW4 is not set to the forced flashing, i.e., no flashing, in Operation S2, Operation S8 is performed. At decision block/Operation S8, if the flash mode switch SW4 is not set to automatic flashing, the flash mode controller 27 sends the shutter signal to the timing generator 8 (Operation S12) so that an image photographed when the flash 28 does not perform any flashing is stored in the CCD 4. The image is displayed on the image display part 15 in the same manner as when the recording/reproduction switch SW2 is set to the recording mode, and is used to control exposure and white balance in Operation 12. Thereafter, the flash mode controller 27 sends the shutter signal to the timing generator 8 to photograph the image (Operation S13), and records the photographed image to the recording media 25 as an image file.

If at decision block/Operation S8 the flash mode switch SW4 is set to automatic flashing, Operation S9 is performed. In Operation S9, the flash mode controller 27 sends the shutter signal to the timing generator 8 so that an image is stored in the CCD 4. The image is input into the AE and AWB detection circuit 21 in the same manner as when the recording/reproduction switch SW2 is set to the recording mode. The AE and AWB detection circuit 21 calculates a brightness evaluation value of the image, and transmits the calculated brightness evaluation value to the CPU 19 as the exposure control signal. The flash mode controller 27 obtains the brightness evaluation value (Operation S9) and compares the brightness evaluation value with a previously defined threshold value (Operation S10). If the brightness evaluation value is smaller than the threshold value the flash 28 must emit light and so Operation S3 is performed. After Operation S3, the flash mode controller 27 operates in the same manner as previously described when the flash mode switch SW4 is set to the forced flashing. However, at decision block/Operation S10, if the brightness evaluation value is greater than the threshold value, the image stored in the CCD 4 in Operation S9 is displayed on the image display part 15 in the same manner as when the recording/reproduction switch SW2 is set to the recording mode, and is used to control exposure and white balance (Operation S11). Thereafter, the flash mode controller 27 sends the shutter signal to the timing generator 8 to photograph the image (Operation S13), and records a photographed image to the recording media 25 as the image file.

In the current embodiment, the scope of the color and brightness for red eye phenomenon is previously defined in Operation S5. The scope can be changed, varied or adjusted according to the brightness evaluation value calculated by the AE and AWB detection circuit 21 (e.g., relative to operations S9 and S10). If a place in which photographing occurs is dark and the brightness evaluation value is smaller than the previously defined threshold value, it is determined that the red eye phenomenon easily occurs, so that the scope of the color and brightness for red eye phenomenon may be increased. To the contrary, if the place in which photographing occurs is dark and the brightness evaluation value is greater than the previously defined threshold value, it is determined that the red eye phenomenon does not easily occur, so that the scope of the color and brightness for red eye phenomenon may be reduced. Therefore, it is possible to avoid a failure in detecting the red-eye phenomenon when it occurs or an error in judgment of the red-eye phenomenon even when it does not occur.

Also, in the current embodiment, the red eye reduction standby time T2 is previously defined. The red eye reduction standby time T2 can be changed, varied or adjusted according to the brightness evaluation value calculated by the AE and AWB detection circuit 21 (e.g., relative to operations S9 and S10). If the place in which photographing occurs is dark and the brightness evaluation value is smaller than the previously defined threshold value, it is determined that the red eye phenomenon easily occurs, and so the red eye reduction standby time T2 may be increased. To the contrary, if the place in which photographing occurs is dark and the brightness evaluation value is greater than the previously defined threshold value, it is determined that the red eye phenomenon does not easily occur, and so the red eye reduction standby time T2 may be reduced.

The flash mode controller 27 determines when the color of the eyes, which is detected by the face detection circuit 26, is red. If the color is dark red, the flash 28 emits light during the red eye reduction standby time T2, thereby reducing the red-eye phenomenon.

The flash mode controller 27 may inform a subject of the red-eye phenomenon during the red eye reduction standby time by controlling light emission from the flash 28 intermittently, switching on or off a light-emitting diode (LED) (not shown), or acoustically beeping so that a person which is a subject can be informed of a fact that the person is in the red eye reduction standby time T2, so that the person refrains from moving since the person may misunderstand that the photographing is finished.

The operation of the digital camera when the photographing mode selection switch SW5 is set to a continuous photographing mode will now be described. In the continuous photographing mode, the digital camera continuously photographs a defined number of screens when the shutter switch SW1 is pressed. The operation of photographing each screen in the continuous photographing mode is the same as that of the single-photographing mode after the CPU 19 sends the shutter signal to the timing generator 8.

If the recording/reproduction switch SW2 is set to a reproduction mode, the CPU 19 opens the image file of the recording media 25 by using the media controller 24 and reads image data. The CPU 19 provides the image data read from the recording media 25 to the image compression/decompression circuit 13. The image compression/decompression circuit 13 processes by expansion the image data and stores the decompressed image data in the VRAM 23. The video encoder 14 generates a component color video signal based on the image data of the VRAM 23, and provides the component color video signal to the image display part 15. Thus, a reproduction image stored in the recording media 25 is displayed on the image display part 15.

When an eye color, detected by a detection constituent from a photographed image after a flashing constituent preliminarily emits light, is within a predetermined scope, a camera of the present invention emits light using the flashing constituent after a red-eye reduction standby time passes, and captures an image. Therefore, even when the red-eye phenomenon occurs, a user can photograph an image in which the red eye is reduced without setting the camera to a red eye reduction mode, thereby easily obtaining an appropriate photographed image.

Since the red eye reduction standby time can be changed according to a photographing environment, the red eye reduction standby time may be increased in a dark place where the red-eye phenomenon easily occurs, so that the user can photograph the image in which the red eye is reduced, thereby easily obtaining an appropriate photographed image.

Also, an informing constituent may inform the user that the user is in the red eye reduction standby time, which prevents a person who is a subject from moving since the person may misunderstand that the photographing is finished, thereby easily obtaining an appropriate photographed image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital camera comprising:
a photographing constituent that photographs a subject;

a flashing constituent that emits light toward the subject during a preliminary flashing operation or a main flashing operation of the flashing constituent based on an analysis of an image captured by the photographing constituent during the preliminary flashing operation; and a detection constituent configured to detect an eye color of a human subject from the image captured by the photographing constituent with the preliminary flashing operation, wherein, when the eye color detected by the detection constituent is within a predetermined red eye scope, a flashing control constituent determines a red eye reduction time and actuates the main flashing operation of the flashing constituent after the red eye reduction time has elapsed, and wherein the flashing control constituent changes the red eye reduction time according to a photographing environment proximate the human subject.

2. The digital camera of claim 1, wherein the flashing control constituent is further configured to flash the flashing constituent during the red eye reduction time when the eye color detected by the detection constituent is dark red.

3. The digital camera of claim 1, further comprising an informing constituent notifies a user of the camera or the human subject that the eye color is red.

4. The digital camera of claim 1 further comprising an informing constituent that notifies the human subject that the red eye reduction time is elapsing.

5. The digital camera of claim 4, wherein the informing constituent comprises a light.

6. The digital camera of claim 5 wherein the light comprises the flashing constituent.

7. The digital camera of claim 4, wherein the informing constituent comprises a sound emission means.

8. A digital camera comprising:
a flash means for illuminating a subject;
a means for capturing a photographic image of the subject;
a means for determining if the subject includes a face with eyes;
a means for determining an eye color of the subject;
an eye color adjustment means for controlling operation of the flash means according to an output from the means for determining an eye color, wherein the eye color adjustment means actuates the flash means to emit a short duration light toward the subject during a preliminary photographing operation in which the photographic image is analyzed for identifying a red eye color, and a long duration light toward the subject during a main photographing operation in which a subsequent photographic image of the subject is stored; and
a red eye reduction timing means for delaying the main photographing operation from the preliminary photographing operation by a variable time according to at least one of a brightness of the image from the preliminary photographing operation and a photographing environment proximate the subject.

9. The digital camera of claim 8 further comprising a notification means in communication with the means for determining an eye color, the notification means informing a user of the camera or the subject that the eye color is red.

10. The digital camera of claim 8 wherein the eye color adjustment means adjusts a flashing time of the flash means.

11. A method for compensating a red eye phenomenon during photographing of a subject with a digital camera, the method comprising:
photographing a first image of the subject using a first flash;
determining if the first image of the subject includes a face with eyes;
if the first image of the subject includes a face with eyes, determining a color of the eyes;
if the eyes have a red color, determining a red eye reduction timing period, and adjusting the red eye reduction timing period according to at least one of a brightness of the first image and an environment of the first image proximate the subject; and
photographing a second image of the subject using a second flash after the red eye reduction timing period.

12. The method of claim 11 wherein the first flash has a shorter duration than the second flash.

13. The method of claim 11 further comprising the step of notifying the subject that the red eye reduction timing period is elapsing.

14. The method of claim 13 wherein the notifying step comprises actuating a flash of the digital camera intermittently.

15. A digital camera comprising:
a photographing constituent that photographs a subject;
a flashing constituent that emits light toward the subject during a preliminary flashing operation or a main flashing operation of the flashing constituent based on an analysis of an image captured by the photographing constituent during the preliminary flashing operation;
a detection constituent configured to detect an eye color of a human subject from the image captured by the photographing constituent with the preliminary flashing operation, wherein, when the eye color detected by the detection constituent is within a predetermined red eye scope, a flashing control constituent determines a red eye reduction time and actuates the main flashing operation of the flashing constituent after the red eye reduction time has elapsed, and
an evaluation constituent configured to evaluate a brightness of the image captured by the photographing constituent, the evaluation constituent and the flashing control constituent cooperating to change the red eye reduction time.

16. The digital camera of claim 15, wherein the flashing control constituent is further configured to flash the flashing constituent during the red eye reduction time when the eye color detected by the detection constituent is dark red.

17. The digital camera of claim 15, further comprising an informing constituent notifies a user of the camera or the human subject that the eye color is red.

18. The digital camera of claim 15 further comprising an informing constituent that notifies the human subject that the red eye reduction time is elapsing.

19. The digital camera of claim 18, wherein the informing constituent comprises a light.

20. The digital camera of claim 19, wherein the light comprises the flashing constituent.

21. The digital camera of claim 18, wherein the informing constituent comprises a sound emission means.

* * * * *